United States Patent [19]
Mathis et al.

[11] 3,869,420
[45] Mar. 4, 1975

[54] SMOKE-RETARDANT HALOGEN-CONTAINING POLYMER SYSTEMS

[75] Inventors: Thomas C. Mathis, St. Louis, Mo.; Albert W. Morgan, Collinsville, Ill.

[73] Assignee: Monsanto Company, St. Louis, Mo.

[22] Filed: Dec. 20, 1972

[21] Appl. No.: 317,040

[52] U.S. Cl... 260/30.6 R, 260/23 XA, 260/31.8 R, 260/42.44, 260/42.49, 260/45.7 P, 260/45.7 R, 260/45.75 R, 260/45.85 R
[51] Int. Cl.............................................. C09k 3/28
[58] Field of Search ... 260/45.75 R, 45.7 R, 30.6 R; 117/137

[56] References Cited
UNITED STATES PATENTS

| 1,633,067 | 6/1927 | Burke | 106/15 |
|---|---|---|---|
| 2,168,587 | 8/1939 | Shuman | 260/30.6 |
| 2,407,668 | 9/1946 | Leatherman | 260/30.6 |
| 2,557,089 | 6/1951 | Gamrath et al. | 260/30.6 |
| 2,561,493 | 7/1951 | Caprio et al. | 106/177 |
| 2,575,686 | 11/1951 | Simon et al. | 260/30.6 |
| 3,658,579 | 4/1972 | Ottinger et al. | 117/137 |
| 3,682,692 | 8/1972 | Lamson et al. | 117/137 |
| 3,723,139 | 3/1973 | Larkin et al. | 260/45.75 |

OTHER PUBLICATIONS

Kirk et al., "Encyclopedia of Chemical Technology," 1969, p. 461, Vol. 18.
McAlpine et al., "Qualitative Chemical Analysis," 1933, p. 414.
Rose et al., "The Condensed Chemical Dictionary," 1966, pages 574 and 575.
Rose et al., "The Condensed Chemical Dictionary," 7th Edition, page 1,032.

Primary Examiner—Donald E. Czaja
Assistant Examiner—R. A. White
Attorney, Agent, or Firm—Robert E. Wexler

[57] ABSTRACT

Smoke-retardant halogen-containing compositions comprising an aliphatic halogen-containing polymer, reactive modifier and phosphate ester.

13 Claims, No Drawings 3,869,420

SMOKE-RETARDANT HALOGEN-CONTAINING POLYMER SYSTEMS

BACKGROUND OF THE INVENTION

For hundreds of years, attempts have been made to protect flammable materials against fire. In recent years, various governmental agencies have adopted fire safety standards concerning many fabrics and construction materials and this trend will accelerate in the future. The increase in yearly numbers of deaths from fires has helped accelerate legislative efforts in this respect.

Increasingly, however, it has become apparent that fire-related deaths are due in only minor proportion to the actual flame of the fire itself. It is now realized that there are three dominant factors in fire-related deaths and that smoke inhalation is the most important of those factors.

The three factors which cause death by fire are:
1. flame,
2. suffocation caused by lack of oxygen, the oxygen having been consumed by the fire, and concomitant increased carbon monoxide concentrations, and
3. suffocation caused by inhalation of smoke which acts as a powerful irritant and which reduces the amount of oxygen available upon inhalation of a given volume of air.

Of those three factors, the latter is considered the main contributor to fire-related deaths, since it has been found that only a few breaths of smoke-filled air is sufficient to incapacitate an individual. Further, lethal amounts of smoke may be generated by even small, relatively innocuous fires.

All organic-based materials will burn, given proper conditions or proportions of heat and air. In recent years, plastic materials have found increasing use and many such materials pose a potential of fire wherever they are used.

Since plastics are organic materials, it would be impossible to make them non-combustible in all situations. Many additives and modifiers have been used to decrease the rate of burning and the spread of flame; however most of the additives and modifiers so-used are organic materials themselves which will burn under proper conditions. Many inorganic materials have also been used as flame retardants, but they are effective only when used in large amounts which are detrimental to polymer properties. Accordingly, known flame-retardant additives, whether organic or inorganic, can be used in only small amounts or the physical properties of the plastic will be adversely affected.

The main cause of fire-related deaths, however, has been overlooked in the quest for better flame retardants. The problem of deaths caused by smoke-inhalation remains.

It is not surprising that smoke reduction technology has not kept pace with flame reduction technology since it has seemed apparent to those skilled in the art that a system for reducing both smoke and flame would not be feasible. It was heretofore believed that smoke propagation was due to incomplete oxidation of the volatile products of pyrolysis and that smoke reduction could be achieved only by more complete oxidation, which inherently meant more flame. Conversely, increased smoke propagation was believed to be the natural and immutable consequence of flame reduction (i.e., reduced combustion).

Accordingly, there is a great need for halogen-containing polymer material having reduced smoking characteristics, which are flame retardant, and which contain smoke and flame controlling additives in amounts insufficient to adversely affect the physical properties of the vinyl polymer.

SUMMARY OF THE INVENTION

In accordance with the present invention, it has been found that plastic compositions, particularly aliphatic, halogen-containing polymer compositions, may be formulated so as to emit greatly reduced quantities of smoke when subjected to burning conditions, without increasing the flammability of the compositions. In many instances, it has been found that both smoke and flame are controllably reduced in the novel compositions of this invention comprising an aliphatic halogen-containing polymer, reactive modifier and phosphate ester.

PRIOR ART

Applicants are aware of the following patents which may be relevant to the compositions of the present invention: U.S. Pat. No. 1,633,067 is directed to reducing the flammability of fabric, wood, rubber, paints, varnishes and cellulose ester and cellulose ether compositions by incorporating therein normal magnesium carbonate trihydrate. An aromatic phosphate ester, camphor or aromatic carbonates may be added to the composition as colloiding agents.

U.S. Pat. No. 2,610,920 is directed to flameproofing combustible material such as textiles, paper and artificial leather by incorporating therein a metallic oxide, a glow-proofer, a metallic salt of a weak organic acid, a chlorinated material and an inhibitor to retard the liberation of hydrochloric acid from the chlorinated material while it is being heated and until it reaches the temperature at which a complex is formed with the cellulose material which is intended to be flameproofed.

French Pat. No. 2,094,527 discloses the treatment of chlorine-containing polymers, such as vinyl chloride polymers, chlorinated polyethylene and polychloroprene, with a filler such as magnesium oxide or magnesium carbonate of very small particle size, or reactive coatings of urea or urea derivatives. The use of the disclosed fillers, without combination with a phosphate ester, does not modify the rate of hydrogen chloride emission until massive and sudden decomposition occurs. The system of French Pat. No. 2,094,527 therefore does not afford a uniform, controllable evolution of hydrogen chloride as does the reactive modifier/phosphate ester composition of the present invention. Further, French Pat. No. 2,094,527 is directed to scavenging hydrogen chloride after massive hydrogen chloride evolution has occurred and smoke and flame emission would not show the dramatic reductions afforded by the composition of the present invention.

SPECIFIC EMBODIMENTS OF THE INVENTION

As previously stated, the main purpose of the present invention is to inhibit the evolution of smoke from halogen-containing polymer compositions by incorporation therein of regulated amounts of reactive modifier in combination with phosphate ester.

In order to understand the unique aspects of the present invention, some understanding of the nature of the processing conditions which aliphatic halogen-containing compositions are subjected to, as well as the mechanisms of flame and smoke propagation are necessary.

Normally, halogen-containing polymer compositions particularly vinyl halide polymer compositions, are subjected to various processing procedures, such as calendering, mixing and extruding, during which heat is absorbed by the polymer composition. The maximum amount of heat which is absorbed by the polymer composition during processing is lower than the amount of heat necessary for pyrolysis. Accordingly, it follows that additives, which are to reduce smoke and/or flame in a halogen-containing polymer subjected to combustion conditions, must be stable under processing conditions. Obviously, if the smoke and/or flame reducing additive is unstable and thereby decomposes under processing conditions, the additive will not be available to function under pyrolysis conditions. Accordingly, the smoke and/or flame reducing additive must therefore be stable under the processing conditions of the polymer compositions. The processing temperatures of halogen-containing polymer compositions usually fall within a range of from about 150°C to about 170°C. This range encompasses not only halogen-containing polymer compositions such as polyvinyl chloride but also takes into account halogenated olefins and diolefins and halogen-containing polymers which are interpolymers of a vinyl halide with other ethylenically unsaturated copolymerizable monomers. In addition to being stable at processing temperatures, the smoke and/or flame retardant additive must react within a temperature range within which it will function and be effective during pyrolysis of the polymer composition.

Little factual data is available to help define the mechanisms of the various stages in the pyrolysis of halogen-containing polymers. It is believed, however, that the oxidation of a material occurs primarily in the gaseous phase and that the actual flame is separated from the surface of the material by a pre-flame zone wherein free radicals (which are not emitted from the burning material and which are required for flame propagation) are formed.

The burning of halogen-containing polymers is unique and is distinguished from the burning of non-halogen-containing polymers, in that hydrogen chloride is evolved. Even under normal processing conditions some hydrogen halide is evolved but it reacts with stabilizers. At temperatures higher than processing conditions, for example, 250° to 500°C., the evolution of hydrogen chloride is not controlled by the stabilizers and is released at a rate roughly 1,000 times the rate of normal hydrogen chloride evolution under processing conditions. At such higher temperatures, the evolution of hydrogen chloride becomes an autocatalytic reaction which further accelerates greater dehydrohalogenation of the polymer. Such massive dehydrohalogenation literally "unzips" the polymer, exposing the polymer backbone as a source of fuel. One of the important aspects of this invention is that dehydrohalogenation is controlled to the extend that autocatalytic dehydrohalogenation is avoided.

It is believed that the reactive modifiers utilized in the present invention react with hydrogen chloride which is evolving to reduce smoke formation and flame spread in two ways:

1. Reduction or inhibition of hydrogen chloride evolution has the effect of slowing the total decomposition of the halogen-containing polymer. Accordingly, inhibiting the evolution of hydrogen chloride contributes to stabilizing the integrity of the polymer and therefore there is less fuel available to be consumed by the flame than if the polymer were "unzipped" by hydrogen chloride evolution, thereby exposing polymeric fuel for combustion. This "unzipping" is caused by the hydrogen chloride which is initially evolved and is adsorbed on the surface of the polymer. By preventing the autocatalytic dehydrohalogenation of the polymer, pyrolysis of the polymer is reduced. Accordingly, volatile fuel from pyrolysis is reduced and it follows that, since there is a smaller amount of fuel in the vapor phase, a smaller amount of particulate matter in the form of smoke is produced.

2. Evolved hydrogen chloride which does not react with the reactive filler apparently escapes to the gaseous phase and acts as a flame poison by trapping free radicals generated during combustion.

In addition to the reactive modifiers of the present invention, it has been found that phosphate esters contribute to inhibiting smoke formation of the halogen-containing polymers. Whereas the reactive modifiers appear to function in the condensed phase to indirectly control the vapor phase, the phosphate esters utilized in the present invention appear to function in both the gaseous and the condensed phases of combustion.

The above theories of the action of the composition of the present invention are presented to provide some insight into the problems and possible mechanisms involved in the oxidative decomposition of halogen-containing polymers. The theories and mechanisms postulated may or may not be accurate. There are, in fact, indications that the results achieved by the present invention may be due to a complex formed by the interaction of the phosphate ester and reactive modifier.

Summarizing, the apparent contradiction of providing halogen-containing polymers which are flame retardant and emit greatly reduced amounts of smoke is explained by the contributions of reactive modifiers and phosphate esters which afford a gradual, rather than sudden, decomposition of the polymer thus effecting a more complete oxidation of the volatile products of decomposition.

In accordance with the present invention, a reactive modifier is defined as a material which reacts with chlorine at pyrolysis temperatures of aliphatic, halogen-containing resin compositions.

The reactive modifiers found to be effective in the controlled reduction of flame and smoke are oxides or salts of metals wherein the oxide or salt is readily displaced by chlorine.

Illustrative metals include lithium, sodium, potassium, magnesium, calcium, barium, zirconium, manganese and iron.

Metals such as zinc, cadmium, mercury, lead and beryllium have been found to be either ineffective or ecologically deleterious.

Oxides and hydroxides of the metals described above are effective as reactive modifiers, as are the carbonates, bromides, bromates and salts of such metals with lower aliphatic acids such as formic, acetic, propionic and butyric acids.

Illustrative reactive modifiers include lithium oxide, potassium oxide, magnesium oxide, calcium oxide, barium oxide, zirconium oxide, manganese oxide, iron oxide, lithium carbonate, potassium bromide, magnesium hydroxide, sodium carbonate, calcium hydroxide, barium bromide, zirconium carbonate, manganese bromide, iron hydroxide, magnesium carbonate, lithium bromate, magnesium bromate, calcium bromate, sodium formate, calcium acetate, zirconium propionate, magnesium butyrate and the naturally-occurring mineral, Dawsonite $(Al_2(CO_3)_3 \cdot Na_2CO_3 \cdot {}_nH_2O)$, and mixtures thereof.

Preferred reactive modifiers include Dawsonite and magnesium oxide, magnesium hydroxide, magnesium carbonate, magnesium bromide, magnesium bromate, magnesium formate, magnesium acetate, magnesium propionate and magnesium butyrate and mixtures thereof.

Especially preferred reactive modifiers are Dawsonite, magnesium oxide, magnesium carbonate and magnesium hydroxide and mixtures thereof.

Phosphate esters which are utilized in accordance with the present invention include trialkyl phosphates, dialklaryl phosphates, alkyldiaryl phosphates and triaryl phosphates.

The preferred phosphate esters are the trialkyl phosphates, dialkylaryl phosphates and alkyldiaryl phosphates since the triaryl phosphates ordinarily decompose at temperatures higher than the temperatures which would be most effective in their capacity as smoke inhibiting agents. Triaryl phosphates, however, can be used when formulated so as to contribute to their decomposition at temperatures lower than their normal decomposition temperatures. Formulation to achieve such an effect with triaryl phosphate esters can be achieved by the addition of compounds which lower the decomposition temperature of the triaryl phosphate ester.

Illustrative phosphate esters which are used in accordance with the present invention include trialkyl phosphates, e.g., tributyl phosphate, trihexyl phosphate, tricyclohexyl phosphate, trioctyl phosphate, tridecyl phosphate, triundecyl phosphate, tridodecyl phosphate, trihexadecyl phosphate, triotadecyl phosphate, hexyl dioctyl phosphate, octyl didodecyl phosphate, trieicosyl phosphate and trialkyl phosphates prepared from mixtures of $C_7$—$C_9$—$C_{11}$ alcohols; dialkylaryl phosphates, e.g., dibutyl phenyl phosphate, dihexyl phenyl phosphate, dioctyl phenyl phosphate, didecyl phenyl phosphate, diisodecyl phenyl phosphate, dihexadecyl phenyl phosphate, octyl dodecyl phenyl phosphate di($C_7$—$C_9$—$C_{11}$) alkyl phenyl phosphate and similar compounds; alkyldiaryl phosphates, e.g., butyl diphenyl phosphate, octyl diphenyl phosphate, decyl diphenyl phosphate, isodecyl diphenyl phosphate, dodecyl diphenyl phosphate, hexadecyl diphenyl phosphate, cyclohexyl diphenyl phosphate ($C_7$—$C_9$—$C_{11}$) alkyl diphenyl phosphate and the like; triaryl phosphates, e.g., nonylphenyl diphenyl phosphate, cumylphenyl diphenyl phosphate, triphenyl phosphate, tricresyl phosphate, trixylyl phosphate and similar compounds.

Preferred phosphate esters which are used in accordance with the present invention are tri-2-ethylhexyl phosphate, isodecyl diphenyl phosphate and 2-ethylhexyl diphenyl phosphate.

The smoke and flame reducing composition of the present invention, comprising phosphate ester and reactive modifier, is normally incorporated into a fully formulated vinyl halide polymer containing filler, stabilizer, plasticizer and the like.

In many instances, however, the formulated polymer normally contains a phosphate ester as the sole plasticizer or as a component of a plasticizer system. In such instances, the reactive modifier alone need only be added, although additional, small amounts of phosphate ester may be necessary.

Under most conditions of use, halogen-containing polymers contain filler materials, e.g., carbon black, calcium carbonate, at a filler level of from about 10 to 150 PHR (parts per hundred of resin) or more. Similarly, halogen-containing polymers usually contain from about 30 to 70 PHR plasticizer or more, depending on the contemplated end use.

Depending on the particular filler and plasticizer levels in a given halogen-containing polymer and, depending on the particular polymer used, the smoke and flame reducing composition of this invention may be incorporated at various concentrations. There is a specific concentration of phosphate ester and reactive modifier which may be added to any specific halogen-containing polymer formulation in order to obtain maximum results, and it will be necessary for those skilled in the art to try various concentrations of phosphate ester and reactive modifier to obtain such maximum results. For instance, a polyvinyl chloride resin filled with 100 PHR carbon black and plasticized with 50 PHR dioctyl phthalate and a vinyl chloride/vinyl acetate copolymer resin filled with 30 PHR calcium carabonate and plasticized with 60 PHR dibutyl adipate present different problems as regards smoke and flame reduction and a certain amount of experimentation will be necessary to afford a given level of smoke and flame reduction in each specific resin system. In many instances, of course, the optimum smoke and flame reduction possible with the composition of this invention may not be desired for reasons relating to commercialization or end use.

In general, however, for filler levels of from about 10 to about 150 PHR and for plasticizer concentrations of from about 10 to about 150 PHR, there should be added sufficient reactive modifier of this invention to constitute from about 15 to about 100 percent of the total filler in the resin system. Similarly, there should be added sufficient phosphate ester of this invention to constitute from about 10 to about 100 percent of the total plasticizer in the resin system.

Preferably, at filler levels of about 20 to about 40 PHR and plasticizer levels of about 30 to about 70 PHR, there should be incorporated sufficient reactive modifier to constitute from about 30 to about 60 percent of the total filler and there should be incorporated sufficient phosphate ester to constitute from about 30 to about 100 percent of the total plasticizer. The latter indicated concentration obviously means that, in certain instances, one may wish to employ the phosphate ester as the only plasticizer rather than use it with another plasticizer.

At a filler level of 30 PHR and a plasticizer concentration of 50 PHR, sufficient reactive modifier and sufficient phosphate ester should be added to constitute about 40 percent of the total filler and about 40 percent of the total plasticizer.

As stated above, one skilled in the art will wish to vary both the reactive modifier and phosphate ester levels in a particular resin system to afford the desired smoke and flame reducing characteristics of the system.

The following examples illustrate specific, nonlimiting embodiments of the invention.

In the following examples, certain tests are made, certain terms are used and comparisons are made on the basis of those tests and terms. Accordingly, the following definitions will serve as a basis for an understanding of the examples:

1. "PHR"—parts per hundred parts of resin
2. "Flame spread"—see explanation below
3. "Flame rating"—see explanation below
4. "Smoke" (percent transmission)—percent of light transmitted through smoke at maximum smoke density.
5. "Smoke rating"—see explanation below The flame spread value is determined by use of an asbestos board as a no-flame-spread reference. The reach of the flame directed against asbestos is subtracted from the farthest advance of the flame of an ignited test specimen. The result is reported in inches. Construction and calibration of the flame tunnel, and details concerning the flame spread test, are given in the Journal of Paint Technology, Volume 39, No. 511, August, 1967. Red oak and asbestos have been assigned flame ratings of 100 and 0, respectively. Flame ratings of plastic test specimens are proportional to 100 for red oak. Therefore the lower the flame spread in inches, and the lower the numerical flame rating, the better is the flame reduction.

The smoke rating procedure involves use of a photoelectric detector attached to a recorder to plot the smoke evolution of the sample. Data representing total smoke evolved during burning of the test specimen are extrapolated by a linear relationship to standardized smoke generation for red oak, which has been assigned a value of 100. Low ratings mean low smoke.

EXAMPLE 1

This example demonstrates the unique smoke and fire reducing effects of reactive modifiers versus fillers, phosphate ester plasticizers versus non-phosphate ester plasticizers and the combination of reactive modifiers and phosphate esters when formulated in polyvinyl chloride. The example further illustrates the unique enhancement of the smoke reducing effects when a reactive modifier is combined with a phosphate ester at high proportion of the total plasticizer. The following master formulation is prepared:

| Ingredients | Parts by Weight |
| --- | --- |
| Polyvinyl chloride | 100 |
| Plasticizer* | 55 |
| Expoxidized linseed oil | 3 |
| Ba-Cd complex (stabilizer) | 2 |

*As indicated in Table I

To the master formulation, fillers are added at levels of 10 and 30 PHR and the filled systems are subjected to the flame spread and smoke generation tests. The results are shown in Table I.

TABLE I

| Formulation No. | PHR Filler Plasticizer | Filler | Two Foot Tunnel Results Flame Spread (in) | Rating (Aug.) | Smoke % Trans. | Rating |
| --- | --- | --- | --- | --- | --- | --- |
| 1. | Phthalate$^a$ | CaCO$_3$ | 9.1 | 103 | 19 | 175 |
| 2. | Phosphate$^b$ | do. | 3.6 | 41 | 31 | 150 |
| 3. | Phthalate$^a$ | MgO | 7.2 | 81 | 50 | 110 |
| 4. | Phosphate$^b$ | do. | 3.4 | 38 | 72 | 55 |
| 5. | Phthalate$^a$ | MgCO$_3$ | 7.1 | 80 | 38 | 125 |
| 6. | Phosphate$^b$ | do. | 2.6 | 29 | 66 | 70 |
| 7. | Phosphate$^b$/Phthalate$^a$ | (3/2)CaCO$_3$ | 4.6 | 52 | 31 | 150 |
| 8. | do. | (3/2)HgCO$_3$ | 3.0 | 34 | 63 | 75 |
| 9. | Phosphate$^c$ | do. | 2.0 | 23 | 38 | 130 |
|  | 30 PHR Filler |  |  |  |  |  |
| 10. | Phosphate$^b$/Phthalate$^a$ | (3/2) Calcite | 5.3 | 60 | 43 | 120 |
| 11. | do. | "Hydral" 705$^d$ | 2.4 | 27 | 25 | 150 |
| 12. | do. | "Dawsonite"$^e$ | 2.1 | 24 | 63 | 70 |
| 13. | do. | MgCO$_3$ | 3.5 | 40 | 68 | 55 |

$^a$· Phthalate ester mixture prepared from mixed 7–11 carbon alcohols
$^b$· Isodecyl diphenyl phosphate
$^c$· Cresyl diphenyl phosphate
$^d$· Alumina trihydrate - Alcoa
$^e$· Hydrated sodium aluminum carbonate - Alcoa Formulations 1–9 illustrate systems containing only 10 PHR reactive modifier or 10 PHR filler. The data show (Formulations 1 and 2) the advantage of a phosphate ester plasticizer over a non-phosphate plasticizer in a system containing a filler (fillers can reduce both smoke and flame at high filler levels, but such high filler levels are detrimental to the physical properties of the resin system). At lower levels, fillers have little or no effect. In Formulations 4 and 6, phosphate ester combined with reactive modifier afford large reductions in smoke and flame as compared to Formulations 3 and 5 which combine reactive modifier with a non-phosphate plasticizer. Formulation 8 shows that when phosphate ester and reactive modifier are present, a less expensive general purpose plasticizer may be used with only minor losses in smoke and flame retardancy. The use of a filler (Formulation 7) with phosphate ester and plasticizer does not produce results comparable to Formulation 8.

Formulations 10–13 illustrate systems containing 30 PHR reactive modifier or 30 PHR filler and, again, dramatic reductions in smoke and flame levels are shown for Formulations 12 and 13 which combine phosphate ester and reactive modifier.

The data shown above illustrates that, by using the smoke and flame retardant composition of this invention, the production of halogen-containing resin systems is possible using low levels of reactive modifier (thereby not affecting physical properties of the resin) and that such resin systems will exhibit dramatically reduced smoke and flame characteristics.

In addition, the data show that the smoke retardant effects of a combination of phosphate ester and reactive modifier are greater than the cumulative effects of those components. Thus, Formulation 2 shows a 31 percent transmission of light (a 12 percent increase in transmission over Formulation 1, which can be attributed to the phosphate plasticizer). Using phthalate plasticizer in Formulation 3, replacement of the filler of Formulation 1 with the reactive modifier of Formulation 3 shows a 50 percent transmission of light (a 31 percent increase in transmission over Formulation 1 which can be attributed to the reactive modifier alone).

If the smoke reduction effect were merely cumulative, the use of a phosphate ester and a reactive modifier should equal the increases in transmission shown for Formulations 2 and 3 over Formulation 1 (a combined increase in transmission of 43 percent — +12 percent in Formulation 2 and +31 percent in Formulation 3). Formulation 4, however, shows an increase in the transmission of light of 53 percent over Formulation 1. Such increase is considerably greater than the cumulative effects shown in Formulations 2 and 3.

Similarly, Formulation 1 shows a 19 percent transmission of light. Formulation 2 (phosphate + filler) shows a 31 percent transmission of light (an increase of 12 percent transmission over Formulation 1 which is attributed to the phosphate plasticizer). Formulation 5 (general purpose plasticizer + magnesium carbonate) shows a 38 percent transmission of light (an increase of 19 percent transmission over Formulation 1 which is attributed to the magnesium carbonate).

If the smoke reduction effects were merely additive, the use of both phosphate and magnesium carbonate (note Formulation 6) should be equal to the increases shown for Formulations 2 and 5 over Formulation 1 (a combined increase of 31 percent — +12 percent in Formulation 2 and +19 percent in Formulation 5). Formulation 6, however, shows an increase in transmission, over Formulation 1, of 47 percent. Such increase is greater than additive.

EXAMPLE 2

The following master formulation is prepared:

| Ingredients | Parts by Weight |
| --- | --- |
| Polyvinyl chloride | 100 |
| Plasticizer* | 55 |
| Epoxidized linseed oil | 3 |
| Ba-Cd complex (stabilizer) | 2 |
| Filler | 12 |

*As shown in Table II

Samples of the Formulation are subject to flame and smoke generation tests. Results are shown in Table II.

TABLE II

| Sample No. | Plasticizer | Filler | Two Foot Tunnel Results Flame Spread (in.) | Rating (Aug.) | Smoke %Trans. | Rating |
| --- | --- | --- | --- | --- | --- | --- |
| 1 | Phthalate[a] | CaCO$_3$ | 9.8 | 110 | 16 | 191 |
| 2 | do. | MgCO$_3$ | 6.7 | 76 | 34 | 134 |
| 3 | Phosphate[b] | CaCO$_3$ | 3.4 | 38 | 21 | 176 |
| 4 | Phosphate[b] | MgCO$_3$ | 2.7 | 31 | 59 | 83 |
| 5 | Phthalate[a]/ Phosphate[b] (2/3) | CaCO$_3$ | 5.3 | 60 | 13 | 195 |
| 6 | do. | MgCO$_3$ | 4.0 | 45 | 52 | 98 |

[a] Phthate ester mixture prepared from $C_7$, $C_9$, $C_{11}$ alcohols
[b] Isodecyl diphenyl phosphate The data further show the great reduction in flame and smoke when combining a phosphate plasticizer with only 12 PHR reactive modifier.

EXAMPLE 3

This example illustrates the comparative effects of fillers and reactive modifiers at levels of 30, 60 and 90 PHR. The data indicate that, at very high filler levels, the massive presence of the inorganic filler material will reduce smoke and flame generation and that the reactive modifiers (combined with a phosphate plasticizer) produce better results at lower levels than the fillers produce at high levels. The advantage of the present invention is therefore shown since the physical properties of the resin system ordinarily declines as filler level increases.

The following formulation is prepared:

| Ingredients | Parts by Weight |
| --- | --- |
| Polyvinyl chloride | 100 |
| Isodecyl diphenyl phosphate | 55 |
| Expoxidized linseed oil | 5 |
| Triphenyl phosphite | 1 |
| Bd-Cd stabilizer | 2 |
| Phenolic antioxidant | 1 |

Various fillers and reactive modifiers are added to the above formulation at levels of 30, 60 and 90 PHR. The following additive materials are used:

| | PHR | | |
| --- | --- | --- | --- |
| 1. Control (no additive) | — | — | — |
| 2. CaCO$_3$ | 30 | 60 | 90 |
| 3. Alumina trihydrate | 30 | 60 | 90 |
| 4. Dawsonite | 30 | 60 | 90 |
| 5. MgO | 30 | 60 | 90 |
| 6. Talc | 30 | 60 | 90 |
| 7. Kaolin | 30 | 60 | 90 |

The formulations are subjected to smoke and flame generation tests. Results are given below.

| Additive | Flame Spread (In.): Control = 7.1 | | |
| --- | --- | --- | --- |
| | 30 PHR | 60 PHR | 90 PHR |
| 2 | 6.0 | 5.2 | 4.5 |
| 3 | 4.2 | 4.1 | 4.2 |
| 4 | 3.4 | 2.0 | 2.1 |
| 5 | 3.1 | 3.7 | 4.3 |
| 6 | 5.3 | 3.8 | 3.1 |
| 7 | 5.4 | 4.3 | 3.1 |

| Additive | Light Transmitted (%) at Maximum Smoke Density Control = 22 | | |
| --- | --- | --- | --- |
| | 30 PHR | 60 PHR | 90 PHR |
| 2 | 26 | 46 | 60 |
| 3 | 38 | 42 | 44 |
| 4 | 59 | 60 | 69 |
| 5 | 73 | 75 | 78 |
| 6 | 42 | 65 | 72 |
| 7 | 36 | 53 | 69 |

The data show that the reactive modifiers (Nos. 4 and 5) give the greatest reduction in flame and smoke generation, at 30 PHR, but not at 60 and 90 PHR where the massive amount of filler makes its presence felt. It is also shown that greater smoke and flame reduction can be obtained by using reactive modifiers at low PHR levels than can be obtained by fillers at higher PHR levels.

Accordingly, the combination of phosphate plasticizer and reactive modifier afford greatly reduced smoke and flame at low filler and high proportions of phosphate ester in the plasticizer, thereby enabling the preparation of halogen-containing resin systems having good physical properties.

It is understood, of course, that the present invention is not limited to the use of a particular phosphate with a particular reactive modifier. Many combinations of reactive modifier and phosphate ester are contemplated as well as mixtures of phosphates.

It is to be further understood that the phosphate and reactive modifier may be admixed with standard compounding ingredients such as stabilizers, UV absorbers, flow control agents, coloring agents and the like.

In polymer systems which contain an effective level of phosphate plasticizer, it is only necessary to incorporate an appropriate amount of reactive modifier, as taught herein, to achieve the benefits of the present invention.

Similarly, in polymer systems which may contain a reactive modifier, it is only necessary to incorporate an appropriate amount of phosphate ester, as taught herein.

Although Examples 1-3 illustrate polyvinyl chloride systems, similar results are obtained in other halogen-containing polymer systems, whether in the form of coatings, articles, foamed products, plastisols, organosols and the like.

Accordingly, the polymers which are smoke and flame controlled in accordance with this invention include simple, unmixed homopolymeric vinyl chloride or copolymers or terpolymers in which the polymeric structure of polyvinyl chloride is interspersed at intervals with the residues of other ethylenically unsaturated compounds which are interpolymerizable therewith. The essential properties of the polymeric structure of polyvinyl chloride are retained if not more than about 40 percent of a comonomer is interpolymerized therewith. Suitable comonomers include vinyl halides such as vinyl bromide or vinyl fluoride; vinyl esters such as vinyl acetate, vinyl chloroacetate, vinyl butyrate and fatty acid vinyl esters; vinyl alkyl sulfonates; trichlorocthylene; vinyl esters such as vinyl ethyl ether, vinyl isopropyl ether and vinyl chlorocthyl ether; aromatic and cyclic unsaturated compounds such as styrene, the mono — and polychlorostyrenes, coumarone, indene, vinyl naphthalene, vinyl pyridine, vinyl pyrrole; acrylic acid and its derivatives such as ethyl acrylate, methyl methacrylate, ethyl methacrylate, ethyl chloroacrylate, acrylonitrile and methacrylonitrile; vinylidene compounds such as vinylidene chloride, vinylidene bromide; unsaturated hydrocarbons such as ethylene, propylene and isobutenes; allylic compounds such as allyl acetate, allyl chloride and allyl ethyl ether; conjugated and cross-conjugated ethylenically unsaturated compounds such as butadiene, isoprene, chloroprene, 2,3-dimethylbutadiene-1,3, piperylene, divinyl ketone and esters such as diethyl maleate and diethyl fumarate.

Specific interpolymers which may be flame retarded in accordance with the present invention include vinyl/chloride/vinyl acetate, ethylene/vinyl chloride/vinyl acetate, ethylene/vinyl chloride/acrylonitrile and the like.

Similarly, other halogen-containing polymers contemplated herein include halogenated olefins, e.g., chlorinated polyethylene and chlorinated polypropylene, halogenated diolefins, e.g., chloroprene, chlorinated paraffins and chlorosulfonated polyolefins, e.g., chlorosulfonated polyethylene and the like as well as polyblends of such halogen-containing polymers with non-halogenated resins.

While the invention has been described by referring to certain specific embodiments, it is not so limited since many modifications are possible in the light of the above teachings. The invention may therefore be practiced otherwise than as specifically described without departing from the spirit and scope thereof.

The embodiments of the invention in which an exclusive property or privilege is claimed are as follows:

1. A vinyl chloride polymer composition comprising
   1. from about 10 to about 30 parts per hundred parts resin of a reactive modifier selected from the group consisting of
      a. Dawsonite,
      b. oxide, hydroxide or salt of a metal selected from the group consisting of sodium, potassium, magnesium, barium, zirconium, manganese and iron, and
      c. mixtures thereof; and
   2. from about 10 to about 100 percent based on total plasticizer of at least one halogen-free neutral phosphate ester the minimum amount of total plasticizer being about 10 parts per hundred parts of resin.

2. Composition of claim 1 wherein said modifier is Dawsonite.

3. Composition of claim 1 wherein said metal is sodium.

4. Composition of claim 1 wherein said metal is potassium.

5. Composition of claim 1 wherein said metal is magnesium.

6. Composition of claim 1 wherein said metal is barium.

7. Composition of claim 1 wherein said metal is zirconium.

8. Composition of claim 1 wherein said metal is manganese.

9. Composition of claim 1 wherein said metal is iron.

10. Composition of claim 1 wherein said phosphate ester is selected from the group consisting of isodecyl diphenyl phosphate and cresyl diphenyl phosphate.

11. A vinyl chloride polymer composition comprising from about 1 to about 50 parts per hundred parts resin of magnesium carbonate and from about 10 to about 100 percent based on total plasticizer of at least one halogen-free neutral phosphate ester the minimum amount of total plasticizer being about 10 parts per hundred parts of resin.

12. A vinyl chloride polymer composition comprising from about 6 to about 30 parts per hundred parts resin of magnesium oxide and from about 10 to about 100 percent based on total plasticizer of at least one halogen-free neutral phosphate ester the minimum amount of total plasticizer being about 10 parts per hundred parts of resin.

13. A vinyl chloride polymer composition comprising from about 10 to about 45 parts per hundred parts resin of magnesium hydroxide and from about 10 to about 100 percent based on total plasticizer of at least one halogen-free neutral phosphate ester the minimum amount of total plasticizer being about 10 parts per hundred parts of resin.

* * * * *

UNITED STATES PATENT OFFICE
CERTIFICATE OF CORRECTION

PATENT NO. : 3,869,420

DATED : March 4, 1975

INVENTOR(S) : Thomas C. Mathis and Albert W. Morgan

It is certified that error appears in the above-identified patent and that said Letters Patent are hereby corrected as shown below:

Column 7, Table I, second column, before the heading "PHR Filler" please insert the numeral -- 10 --; same Table, Formulation 8, under the heading of "Filler" please correct "(3/2) HgCO$_3$" to read -- (3/2) MgCO$_3$ --.

Column 9, Table II, under the heading of "Plasticizer" Formulation 5 should be corrected to read
-- Phthalate[a]/Phosphate[b] (2/3) --.

Signed and sealed this 17th day of June 1975.

(SEAL)
Attest:

RUTH C. MASON
Attesting Officer

C. MARSHALL DANN
Commissioner of Patents
and Trademarks